United States Patent [19]

Vives et al.

[11] Patent Number: 5,160,471

[45] Date of Patent: Nov. 3, 1992

[54] PROCESS FOR MANUFACTURING A THERMOSTRUCTURAL COMPOSITE BY CHEMICAL VAPOR DEPOSITION USING LINKING THREADS

[75] Inventors: Michel Vives, Eysines; Jean L. Limousin, La Musardiere, both of France

[73] Assignee: Societe Europeenne de Propulsion, Sureness, France

[21] Appl. No.: 679,777

[22] Filed: Apr. 3, 1991

[30] Foreign Application Priority Data

Apr. 9, 1990 [FR] France ................... 90 04535

[51] Int. Cl.[5] ............................................. B32B 31/00
[52] U.S. Cl. ..................................... 264/136; 156/242;
264/257; 264/258; 427/255.2
[58] Field of Search ................ 264/29.1, 29.5, 81,
264/82, 136, 257, 258; 427/248.1, 249, 255,
255.2, 255.3; 156/87, 89, 242, 288, 289, 323

[56] References Cited

U.S. PATENT DOCUMENTS

| | | | |
|---|---|---|---|
| 3,895,084 | 7/1975 | Bauer | 264/29 |
| 4,752,503 | 6/1988 | Thebault | 427/248.1 |
| 4,863,660 | 9/1989 | Cahuzac et al. | 264/257 |
| 5,034,172 | 7/1991 | Vives et al. | 264/257 |

FOREIGN PATENT DOCUMENTS

| | | |
|---|---|---|
| 2401888 | 3/1979 | France . |
| 436092 | 5/1967 | Switzerland . |
| 1549687 | 7/1977 | United Kingdom . |

Primary Examiner—Tim Heitbrink
Attorney, Agent, or Firm—Weingarten, Schurgin, Gagnebin & Hayes

[57] ABSTRACT

A fibrous preform (10) of the component to be manufactured is conformed in the desired shape with the desired degree of compacting, prior to densification by chemical vapor deposition. The conformation is achieved by linking the preform (10) onto a rigid shaping device (12) by threads (30) that traverse the preform (10) and pass through holes (14) in the shaping device. The linking threads (30) are made of carbon or ceramic. Prior to the linking, a covering layer (16) may be arranged on the face of the preform (10) opposite to the one turned towards the shaping device.

12 Claims, 1 Drawing Sheet

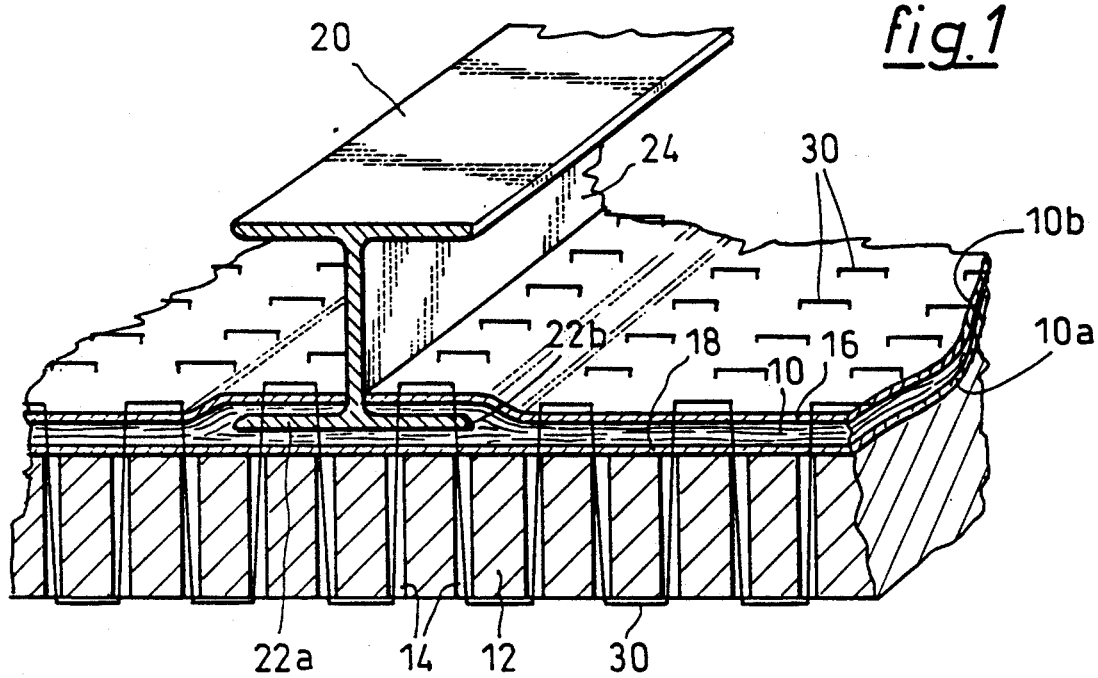
fig.1
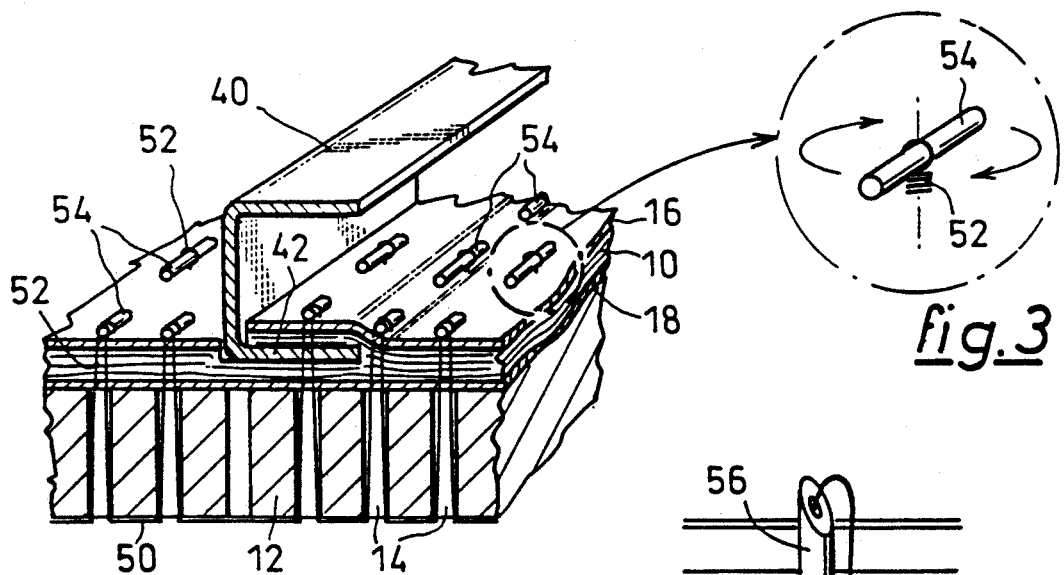
fig.2
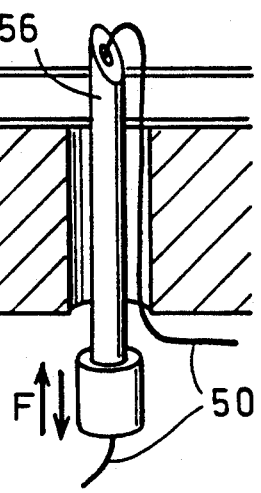
fig.3
fig.4

PROCESS FOR MANUFACTURING A THERMOSTRUCTURAL COMPOSITE BY CHEMICAL VAPOR DEPOSITION USING LINKING THREADS

BACKGROUND OF THE INVENTION

1. Field of the Invention

The present invention relates to the manufacture of thermostructural composite material components, in particular web-like components or panels made by densifying a fibrous preform with a matrix through chemical vapor deposition within the pores of the preform.

A thermostructural composite material is understood to designate a material which has the required mechanical properties to form a structural element and which maintains these properties at high temperatures. Typical examples of such materials are carbon-carbon (C-C) composites, made from a fibrous preform densified by a carbon matrix, and ceramic matrix (CMC) composites, made from a refractory fiber preform (carbon or ceramic fibers) densified by a ceramic matrix. In CMCs, the ceramic material most commonly used for the matrix—and the reinforcement fibers too—is silicon carbide.

Processes for chemical vapor deposition of carbon and silicon carbide are well known in the art, and described in documents U.S. Pat. No. 3,895,084 and FR-A-2 401 888, for instance.

The fibrous preform, which constitutes the reinforcement of the composite material, can be made from various fibrous textures, including felts, cloths or layers of parallel oriented fibers. These textures can be arranged in plies that can be interlinked by needling or by implanting threads according to well-known techniques.

In preparation of the densification, the fibrous preform is placed in a shaping tool, usually made of graphite. The tools serve to maintain the fibrous preform in the desired shape, corresponding to the component to be made, and can also be used to compact the preform in order to obtain the required volume ratio of fibers (the fraction of the preform's apparent volume effectively occupied by fibers).

In a first phase, the chemical vapor deposition of the matrix-forming material is carried out to an extent sufficient to consolidate the preform, that is to obtain a sufficient linking of the fibers to allow the preform to retain its shape when handled, without need for the shaping tool. The consolidated preform can thus be removed from the tool, and the chemical vapor deposition process pursued until the required degree of densification is obtained.

2. Prior Art

The manufacture of relatively large web-like components or panels causes problems at the consolidation stage.

Indeed, because of the component's size and relatively small thickness, as well as the need to incorporate a large number of stiffeners, it is necessary to use highly complex graphite shaping tools.

These tools consist of many parts, on the one hand so as to cover the surface of the preform, and thus hold it in shape and provide the required degree of compacting, and on the other to maintain the stiffeners on the web. Indeed, the stiffeners are integrated at the densification stage. The stiffeners are themselves pre-densified—or consolidated—and their bonding to the remainder of the component is achieved by a co-densification, in which the matrix material effectively "glues" the stiffeners onto the panel or web by virtue of the continuity of the matrix at their interfaces with these components.

These tools are long and expensive to make, and their assembly is complex. Also, in the course of densification, these tools receive a deposit of the matrix material used to manufacture the component. Accordingly, the tools must be renovated each time before being re-used. These renovations cannot be repeated too often, as the tool would otherwise suffer dimensional alterations, or even be deteriorated to the point of being unusable. Consequently, the tools are in practice rejected after only a few uses, considerably increasing the costs of the manufactured components.

Finally, during densification, part of the holding tool can mask the preform, despite the provision of perforations on the tool. This masking hinders the access of the infiltration gas into the pores of the preform, and leads to a non-uniform densification.

SUMMARY OF THE INVENTION WITH OBJECTS

It is therefore an aim of the present invention to provide a process for shaping preforms by means of a simplified tool, especially in the manufacture of web-like components or panels, including those with integrated stiffeners.

According to the invention, the above aim is achieved through a shaping of the preform by linking the latter onto a rigid shaping device by means of threads that traverse the preform and pass through the holes in the shaping device.

Accordingly, the rigid tooling is limited to the shaping device against which one of the faces of the preform is applied. The preform is held in shape and compacted by the linking (or stitching) of the latter onto the shaping device.

The threads used for the above linking are preferably carbon or ceramic threads, which retain their integrity throughout the chemical vapor deposition phase.

After densification, or at least after consolidation of the preform, the latter is withdrawn from the shaping device by breaking the linking threads. These remain implanted through the resulting component and constitute an additional reinforcement that is particularly effective against inter-laminar shearing (that is, shearing parallel to component's faces).

Advantageously, a covering layer is placed on the face of the preform opposite the one facing the shaping device, before the linking.

The covering layer is a two-dimensional fibrous material, such as canvas- or satin-woven cloth made from refractory fibers. The purpose of the covering layer is to distribute the compacting forces produced by the linking threads over the surface of the preform.

The texture of the covering layer is sufficiently ventilated to allow an easy and uniform access to the gas flow during infiltration of the preform.

The covering layer can be made of a material having an expansion coefficient different to that of the preform material. As the densification by chemical vapor deposition is conducted at a relatively high temperature, the difference in expansion between the covering layer and the preform will, upon cooling after the infiltration, give rise to ruptures at the level of the interface between the preform and the covering ply co-infiltrated by the matrix material. At the end of the preform's consolidation phase, the covering layer can thus be easily separated from the preform. The surface coating, which is principally formed on the layer, is eliminated by withdrawing the latter from the preform. Consequently, the pores at the heart of the preform are easily accessible to continue the densification, without it being necessary to proceed with a descaling of the preform. Moreover, there is obtained a homogeneous and uniform surface state.

Advantageously, the integration of elements to the preform is obtained by means of linking threads that join these elements to the preform.

Thus, in the manufacture of webs or panels fitted with integral stiffeners, for example, the co-densification bonding together the stiffeners and the web or panel is advantageously reinforced by the linking threads.

BRIEF DESCRIPTION OF THE DRAWINGS

The invention shall be more clearly understood from the following description of the preferred embodiments of the invention, given as a non-limiting example, with reference to the accompanying drawing in which:

FIG. 1 is a partial schematic drawing illustrating an implementation of the inventive process for shaping a fibrous preform in the manufacture of a composite material structural panel with integrated I shaped stiffeners;

FIG. 2 illustrates another implementation of the inventive process;

FIG. 3 is an enlarged-scale detailed view illustrating the adjustment of the tension in the preform's linking threads, in the case of FIG. 2; and FIG. 4 illustrates how the linking threads are installed in the implementation of the inventive process.

DETAILED DESCRIPTION OF THE PREFERRED EMBODIMENTS

The process according to the present invention can be implemented in the context of the manufacture of a thermostructural composite material structural component in the form of a relatively large panel fitted with integral stiffeners. Such a panel may, for instance, form a structural component of a space vehicle exposed to high temperatures in operation.

A preform 10 of the panel (FIG. 1) is produced from a superposition of plies of texture made from refractory fibers (carbon or ceramic). The plies may e.g. comprise layers of cloth or felt, layers of parallel oriented threads, or complexes consisting of a layer of cloth or a pre-needled layer of threads with a web of fibers. The layers can be linked together by needling. One of the faces 10a of the preform 10 is applied against a rigid shaping device 12 that forms an element of a tool whose shape corresponds to that of the panel to be made. The shaping device 12 is made of graphite and is perforated with a multiplicity of holes 14 to allow the gaseous infiltration flux to access face 10a during infiltration.

The face 10b of the preform 10 opposite face 10a is fitted with a covering layer 16 made e.g. from a relatively well ventilated layer of canvas or satin armored cloth. This covering layer 16 is preferably made from a material having an expansion coefficient different to that of the preform material. Accordingly, when a ceramic fiber based preform is used, the layer can be made from a carbon fiber based cloth. On the other hand, when the preform 10 is made from a carbon based cloth, the layer 16 can be a cloth made from silicon carbide fibers, or a cloth made of silicon carbide modified by a deposition of ceramic material, e.g. silicon carbide, on the fibers.

Several stiffeners 20 (only one is shown in FIG. 1) can be integrated to the preform 10. In the example shown, each stiffener has an I-section profiled shape that comes to bear against the preform 10 on one of its bases.

The stiffeners 20 are made from a fibrous reinforcement texture of the same nature as the preform 10, and may be pre-densified (consolidated) by a matrix, preferably identical to that of the panel to be made. The thus-consolidated stiffeners 20 can be handled once their densification is completed during the densification of the preform 10.

As shown in FIG. 1, a stiffener 20 is integrated by inserting wing sections 22a, 22b of the base of the stiffener 20 within the plies constituting the preform 10. To that end, the latter has an incision on a portion of its thickness where the stiffener is positioned, so as to enable the two wing section 22a, 22b to be lodged between two plies of the preform. Accordingly, each wing section 22a, 22b is covered by a part of the preform 10 that extends up to the core 24 of the stiffener. Likewise, the covering layer 16 is interrupted at the level of the stiffener 20 and extends above its wing sections up to the core 24 of the stiffener.

The preform 10 is held on the shaping device 12 by a linkage provided by threads 30 that traverse the covering layer 16 and preform 10 and pass through holes 14 in the shaping device, or at least in a part of the latter. In the example shown in FIG. 1, the threads form sewing lines that pass alternately from one side to the other of the assembly comprised of shaping device 12, the preform 10 and the covering layer 16.

The threads 30 may also pass through the wing section 22a, 22b of the stiffeners 20 and thus ensure the linkage of the stiffeners to the preform. This is the case when the stiffener's preform has not been pre-densified—or consolidated—or again when the pre-densification has been sufficiently limited so as not to hinder the implantation of the linking threads. If the preform's stiffeners are not to be densified, it would then of course be necessary to provide a tool for holding these preforms on the preform 10 of the panel. Such a holding tool (not shown) is considerably simplified compared with what would otherwise be necessary to keep in shape both the stiffeners' preforms and the panel's preform 10. It is withdrawn as soon as the stiffeners' preforms are consolidated.

The threads 30 are made of a refractory material, such as carbon, or a ceramic material, so that they can retain their integrity during the densification stage.

The stitching with the threads 30 forces the preform 10 mold against the shaping device 12, so imprinting the intended shape onto the preform 10. Moreover, it is possible to compact the preform 10 by exerting a tension on the threads 30. The covering layer 16 helps to spread the stresses exerted by the linking threads, so that a uniform compacting can be achieved.

The assembly is then placed inside an infiltration furnace to obtain the densification by chemical vapor deposition. If the matrix is made of ceramic material, such as silicon carbide, it is advantageous to coat the fibers with an intermediate pyrolytic carbon or boron nitride deposit, using a chemical vapor deposition process, as described in document U.S. Pat. No. 4,752,503.

When the preform 10 has been consolidated, the infiltration process can be interrupted to separate the preform from the shaping device 12, and remove the covering layer 16. To that end, the linking threads 30 are first of all broken at the rear of the shaping device. If need be, the tool used for holding the stiffeners' preforms may also be withdrawn.

As already explained, the difference in the expansion coefficients of the materials forming the preform 10 and the covering layer 16 facilitates the removal of the latter. In removing the covering layer 16, the surface coating thereon is eliminated at the same time, so obviating the need for any descaling of the opposite face 10b of the preform. The covering layer 16 is peeled off using a tool that breaks the linking threads at the same time.

It is to be noted that an interposition layer 18, identical in nature to the covering layer 16, can be placed between the shaping device 12 the preform 10 and traversed by the linking threads 30. The breaks at the interface between layer 18 and the preform 10, and also that layer 18 and the shaping device 12 facilitate the demolding of the preform 10 and the removal of the layer itself 18. The surface coating formed on layer 18 is thereby also removed, obviating the possible need for descaling of the opposite face 10b of the preform. The use of interposition layers in view of facilitating the separation between a densified preform and a holding tool is described in commonly owned U.S. patent application Ser. No. 620,157 of Nov. 29, 1990.

The co-densification of the assembly comprised of the preform 10 and stiffeners 20 can then be continued until the required degree of densification is attained. The sections of linking thread left in place contribute towards increasing the panel's inter-laminar shear resistance.

FIG. 2 illustrates a variant in the implementation of the inventive process, also for the manufacture of a panel fitted with integral stiffeners.

In FIG. 2, there is again depicted the preform 10 arranged over the shaping device 12, which has previously been covered by an interposition layer 18, as well as the covering layer 16 arranged on the preform 10.

In this example, the stiffeners 40 (of which only one is shown in FIG. 2) consist of C-section profiled elements. They are made from fibrous reinforcement textures that may optionally be densified (consolidated).

As shown in FIG. 2, each stiffener 40 is integrated to the preform 10 by engagement of its wing section 42 between two plies of the preform 10, an incision being made on an upper part of the latter's thickness to allow the wing section 42 to engage. Likewise, the covering layer 16 is interrupted at the level of the position of the stiffener.

The preform 10 is applied—and optionally compacted—on the shaping device 12 by means of threads 50. The latter can also provide the linkage between the stiffeners 40 and the preform 10, as indicated in implementation according to FIG. 1.

In this example, each thread 50 runs along the rear face of the shaping device 12 and is implanted through holes 14—or at least a number of these holes, with layer 18, the preform 10 and layer 16 each time forming a loop 52. At the location of the stiffeners 40, the threads 50 can also be made to cross through their wing sections.

A rod 54 is engaged in the upper end of each loop 52, so as to block the latter by pressing against the covering layer 16. The rods 54 are made of a ceramic or metallic material capable of withstanding attacks due to the gases and the high temperatures encountered during the densification of the preform. These rods 54 serve not only to block the loops 52, but also to distribute the tensile forces exerted by the threads 50.

The tensile force exerted by the threads 50 can be adjusted at the level of each loop 52 by rotating the rod 54 through a more-or-less large number of turns, thus generating a torsion of the loop 52, as illustrated in FIG. 3.

FIG. 4 illustrates a hollow needle 56 through a thread 50 is introduced, and which itself engages through the holes 14 of the shaping device 12, and through the assembly comprised of the layer 18, the preform 10, and layer 16, as well as possibly through the wing section 42 of the stiffeners, to form the loops 52. The hollow needle 56 has a beveled end, and is inserted into the preform by passing through the holes whilst being displaced in reciprocating movements (arrows F).

What is claimed is:

1. A process for the manufacture of a thermostructural composite material component consisting of a fibrous preform densified by a matrix, said process comprising the steps of producing said fibrous preform, configuring said preform to maintain said preform in a desired shape and with a desired degree of compacting, by linking said preform onto a rigid shaping device by way of threads traversing said preform and passing through holes in said shaping device to form a configured preform and densifying said configured preform by a chemical vapor infiltration of a material constituting said matrix.

2. The process of claim 1 wherein said threads are made of a material selected from a group consisting of carbon and ceramics.

3. The process of claim 1, wherein, prior to said linking of said preform, a covering layer is arranged over a surface of said preform opposite to the surface facing said shaping device.

4. The process of claim 3, wherein said covering layer is made of cloth.

5. The process of claim 3, wherein said covering layer is made of a material having an expansion coefficient different to that of said material constituting said preform.

6. The process of claim 1, wherein an interposition layer is arranged between said preform and said shaping device.

7. The process of claim 1, wherein said preform comprises a superposition of plies and fitted with integrated stiffeners, said stiffeners consisting of profiled elements made of a partially densified fibrous texture, wherein each stiffener is integrated to said preform by insertion of at least one wing section of each stiffener between two plies of said preform, through an incision formed in said preform.

8. The process of claim 7, wherein each stiffener is joined to said preform by way of said threads passing through said at least one wing section of each stiffener.

9. The process of claim 1, wherein each thread is inserted through said holes in said shaping device and said preform by stitching.

10. The process of claim 1, wherein each thread is introduced through said holes in said shaping device and said preform to form a stitch having a loop that is blocked by way of a rod inserted through each loop and pressing against said preform.

11. The process of claim 10, wherein tension of said threads is adjusted by torsion of said loops by way of said rods.

12. The process of claim 1, wherein said threads are introduced through said holes in said shaping device and said preform by way of a hollow needle.

* * * * *